(12) United States Patent
Zeibak

(10) Patent No.: US 8,458,140 B2
(45) Date of Patent: Jun. 4, 2013

(54) APPARATUS AND METHOD FOR EVALUATING DATA POINTS AGAINST CADASTRAL REGULATIONS

(75) Inventor: Marwan Zeibak, Nazareth (IL)

(73) Assignee: GEO Pioneers Ltd., Nazareth (IL)

( * ) Notice: Subject to any disclaimer, the term of this patent is extended or adjusted under 35 U.S.C. 154(b) by 77 days.

(21) Appl. No.: 11/993,866

(22) PCT Filed: Jun. 27, 2006

(86) PCT No.: PCT/IL2006/000748
§ 371 (c)(1),
(2), (4) Date: Dec. 24, 2007

(87) PCT Pub. No.: WO2007/000765
PCT Pub. Date: Jan. 4, 2007

(65) Prior Publication Data
US 2010/0070465 A1     Mar. 18, 2010

Related U.S. Application Data

(60) Provisional application No. 60/693,787, filed on Jun. 27, 2005.

(51) Int. Cl.
*G06F 17/30*     (2006.01)
(52) U.S. Cl.
USPC ............. 707/688; 707/609; 707/758; 702/76; 702/94; 702/95
(58) Field of Classification Search
USPC .................. 702/1, 16, 19, 188, 5, 3, 8, 14, 23, 702/30, 56, 74, 76, 75, 79, 94, 95; 705/408, 705/404, 406; 709/220, 250, 222; 707/609, 707/688, 758
See application file for complete search history.

(56) References Cited

U.S. PATENT DOCUMENTS

| | | | |
|---|---|---|---|
| 3,945,730 A * | 3/1976 | Simecek et al. | 356/399 |
| 4,060,718 A | 11/1977 | Huddle | |
| 4,347,739 A * | 9/1982 | Stegmann et al. | 73/170.16 |
| 5,684,940 A * | 11/1997 | Freeman et al. | 345/630 |
| 5,724,072 A * | 3/1998 | Freeman et al. | 345/648 |
| 6,411,371 B1 * | 6/2002 | Hinderling et al. | 356/4.01 |
| 6,442,483 B1 | 8/2002 | Doglione | |

(Continued)

OTHER PUBLICATIONS

A comparison of address point parcel and street geocoding, Paul A. Zand bergen, Nov. 2007.*
On the accuracy of tiger-type geocoded address data relation to cadastral and census areal units, 2001.*

(Continued)

*Primary Examiner* — Jean M Corrielus
(74) *Attorney, Agent, or Firm* — Stein IP, LLC

(57) ABSTRACT

A system for evaluating data points against cadastral regulations to include a plurality of software modules programmed into a computer system with software and hardware configured to store and update a cadastral rule database containing a plurality of rules for determining the validity of the cadastral data (10). The cadastral database obtained from a data source reference data that is indicative of a plurality of established reference data points wherein the received input data corresponds to a plurality of measured data points with steps to co-process the input data and the referenced data according to the plurality of cadastral rules to determine an indication for the plurality of data points (20).

14 Claims, 9 Drawing Sheets

U.S. PATENT DOCUMENTS

| | | | | |
|---|---|---|---|---|
| 6,504,602 B1* | 1/2003 | Hinderling | ............... | 356/5.1 |
| 6,734,952 B2* | 5/2004 | Benz et al. | ............... | 356/5.01 |
| 7,043,364 B2* | 5/2006 | Scherzinger | ............... | 701/470 |
| 7,079,234 B2* | 7/2006 | Vogel | ............... | 356/141.1 |
| 7,106,328 B2* | 9/2006 | Royan | ............... | 345/428 |
| 7,574,302 B2* | 8/2009 | Fletcher et al. | ............... | 702/1 |
| 7,679,727 B2* | 3/2010 | Benz et al. | ............... | 356/4.01 |
| 7,729,910 B2* | 6/2010 | Printz | ............... | 704/236 |
| 7,742,176 B2* | 6/2010 | Braunecker et al. | ............... | 356/614 |
| 8,077,913 B2* | 12/2011 | Euler | ............... | 382/103 |
| 2003/0114984 A1* | 6/2003 | Scherzinger | ............... | 701/216 |
| 2003/0169414 A1* | 9/2003 | Benz et al. | ............... | 356/5.1 |
| 2003/0220734 A1 | 11/2003 | Harrison | | |
| 2004/0172264 A1* | 9/2004 | Fletcher et al. | ............... | 705/1 |
| 2005/0203701 A1* | 9/2005 | Scherzinger | ............... | 701/207 |
| 2006/0117034 A1* | 6/2006 | Sokolov et al. | ............... | 707/100 |
| 2008/0204699 A1* | 8/2008 | Benz et al. | ............... | 356/4.01 |

OTHER PUBLICATIONS

Merging the modeling and working addresses database, 2005.*
An approach to geocoding based on volunteere spatial data, 2001.*
A comparison of address point parcel and street geocoding techniques, 2000.*
Ng'ang'a, Sam et al.: "Toward a 3D marine cadaster in support of good ocean governance: a review of the technical framework requirements", Computers Environment and Urban Systems, New York, NY, vol. 28, No. 5, Sep. 1, 2004, pp. 443-470.
Aversano, Lerina et al.: "A framework for measuring business processes based on GQM", System Sciences, 2004, Proceedings of the 37$^{th}$ Annual Hawaii International Conference, Piscataway, NJ, IEEE, Jan. 5, 2004, pp. 12-21.
European Search Report dated Oct. 5, 2012, issued in corresponding European Application No. 06745186.4-1236 / 1897013 PCT/IL2006000748.

* cited by examiner

FIG. 8

APPARATUS AND METHOD FOR EVALUATING DATA POINTS AGAINST CADASTRAL REGULATIONS

FIELD AND BACKGROUND OF THE INVENTION

The present invention relates to the cadastre system and, in particular, it concerns evaluation of measured survey data points against one or more cadastral regulations.

The cadastre system is the system in virtually every country which is used for real estate registration of title, most directly expressed as land boundaries. With regard to the geodetic process of describing real estate locations in a given region, the cadastre system plays both a legal and a technical role. In this specification and in the claims which follow, the terms "cadastral regulation" refers to any set of regulations which make up what is typically referred to as a surveyor ordinance or regulation, as applied in countries, provinces, and other regions responsible for regulating land and land titles.

Cadastral regulations are applied in the supervision of surveying and mapping processes of cadastral objects in respective countries throughout the world. The task of measuring a cadastral parcel is typically performed by licensed surveyors and those operating in accordance with cadastral regulations. Typically, a survey agency or similar governmentally-empowered body is responsible for defining and updating cadastral regulations and for granting licenses to requests by requestors (typically licensed surveyors).

During especially the last decade, governmental survey agencies have been forced to update cadastral regulations at a high frequency. Three main factors are responsible for survey agencies to update cadastral regulations:

the ongoing need to update/upgrade cadastral system processes;

the overall development of new surveying technology; and the wide and rapid adaptation of new surveying instruments.

New survey instruments usually suggest new measurement methods, which are cheaper, faster, and more accurate than methods previously used. Most licensed surveyors tend to use new instruments shortly after the instruments are commercially available at reasonable prices. An example of some modern instruments is in the field of Global Positioning Satellite GPS, as applied to surveying, especially Real Time Kinematics GPS (RTK GPS), which is still under examination in many countries. Belle and Wahl, in an article entitled "Cadastral Survey Accuracy Standards", in *Surveying and Land information Science*, Vol 63, No. 2, 2003 (pp. 87-106), whose disclosure is incorporated herein by reference, provide an excellent and timely overview of the subject of historical and contemporary methods and constraints related to cadastral surveying, as well as recommendations for specific contemporary standards for cadastral applications employing recent advances in GPS instruments and technology. Two other articles of the exemplary application of GPS technology, whose disclosures are incorporated herein by reference, is "Preliminary Draft Guidelines for Geospatial Positioning Using GPS", Draft 7, Jun. 10, 2001, Joe Evjen, National Geodetic Survey http://www.ngs.noaa.gov/PROJECTS/GPSmanual/GPSguide.pdf and "Section 12—GPS Surveying, Survey Practice Handbook", Surveyors Board of Victoria, Dept of Land Information, State of Victoria, Australia http://www.land.vic.gov.au/web/root/domino/cm_da/lcn1c2.nsf/frameset/surveying.

A governmental survey agency must therefore evaluate new instruments to guide surveyors as to the most accurate and reliable ways of using the new instruments. In a similar manner, a survey agency can decide on newer technological standards for measuring. An example for updating a control network could be understood when a survey agency may decide to make Permanent GPS Stations (PGS) the basis of a national control network using Virtual Reference Station (VRS) technology.

The modern cadastral system describes every cadastral object, such as a cadastral parcel, by a set of points. The modern cadastral system, called the Legal Cadastre System (LDC) uses the coordinate values of a point in the national grid system for describing a cadastral parcel. The term "Legal" in LDC is used because of the fact that in a court of law coordinate values of cadastral points are the main evidence of a valid boundary location. As such, surveyors performing measurements in the field, as well as surveyor agencies and regulators responsible for licensing and formally endorsing such field measurement data, must be as careful as possible in reviewing measurement data against cadastral regulations. Essentially, all measurement data, most especially all measured data points, must be completely checked before submittal for licensing and again completely checked by the survey agency to grant a license.

In the past, the number of field points surveyed and the coordinate data obtained from measuring these points was limited, due to technological limitations and also due to the cadastral regulations then in effect. However, today, the number of measurement points and the resultant coordinate data has increased by a number of orders of magnitude. The sharp increase in the number of data points, yielding vastly larger data sets, coupled with the accelerated increase in cadastral regulations represent a new and daunting challenge to both licensed surveyors and to surveyor agencies, and the effort in reviewing and evaluating data sets against cadastral regulations has increased significantly.

When working in the field, the objective of licensed surveyors is to measure a sufficient quality and quantity of points to satisfy requirement of appropriate cadastral regulations. Naturally; a surveyor attempts to work as efficiently as possible and to limit the energy and time expended in the field. Days or weeks after measurements have been made in the field, should a cadastral regulation review and/or analysis of a measured data set yield unacceptable results, the surveyor may have no choice, however, but to return to the field to either augment his data set or to develop a new data set. Certainly a way or device to rapidly evaluate a measurement data set in the field against cadastral regulations could have high value to avoid additional field measurement sessions when, for example, only an additional 30 minutes of measurements were lacking from a data set to allow successful fulfillment of cadastral regulations. At the same time, such a tool could contribute to time and work savings by avoiding the superfluous additional field measurements "just to be sure".

Additionally, in many locales, when a licensed surveyor submits a set of data as part of a request for a license of a given cadastral parcel, he may be proscribed by law from specifying the cadastral regulation or regulations against which the survey was performed and against which the data set was developed. Because of this situation, the survey agency must typically check a submitted data set against all applicable cadastral regulations—and not against the specific regulation or regulations intended by the licensed surveyor—before the survey agency can give a final response as to which specific regulation or regulations the request and data set successfully fulfill.

All of these factors have contributed to heavier work loads and to a significant increase in response times from survey agencies in granting licensing requests and/or reports.

As a result, there is a need for improved methods and tools in evaluation of measured survey data points against one or more cadastral regulations to allow rapid evaluation of data points sets against cadastral regulations, either in the field or at the desktop.

SUMMARY OF THE INVENTION

The present invention is an apparatus and method for evaluating data points against cadastral regulations.

According to the teachings of the present invention there is provided, a system for evaluating data points against at least one cadastral regulation including a plurality of software modules programmed into a computer, the computer having a CPU, a memory, and I/O hardware, the plurality of modules being configure to: store and update a cadastral rule database containing a plurality of rules for determining validity of cadastral data; obtain from a data source reference data indicative of a plurality of established reference data points; receive input data corresponding to a plurality of measured data points; and co-process the input data and the reference data according to the plurality of rules to determine an indication of validity for the plurality of data points. Most preferably, the plurality of modules further includes a method definition module adapted to define at least one regulation method to operate upon a data point type, the at least one regulation method including: at least one of the plurality of rules for the co-processing; a specification of a textual regulation descriptor. Preferably, the method definition module is further adapted define at least one regulation method for at least three data points including: a new horizontal point (NHP); a new vertical control point (NVC) and a new boundary point (NBP). Typically, the coordinate operating functions include: a calculation method to adjust data point coordinate values to allow closure of the data points; and a transformation method to transform an internal coordinate network associated with the input data to another coordinate network associated with at least one reference point. Most preferably, the plurality of modules further includes a rule editor module activated by the method definition module, the rule editor module configured to input, edit, and recall from the cadastral rule database at least one regulation rule of the plurality of rules. Typically, the rule editor module is further configured to edit rule parameters of the at least one regulation rule and to update and include the at least one regulation rule, along with at least one of the plurality of rules for the co-processing, in the at least one regulation method. Further typically, the rule parameters include generic rule parameters and specific rule parameters Most preferably, the generic rule parameters include: a specification to apply or not to apply the coordinate operating functions during co-processing and an indication of a rule category, including at least: point, measurement, and structure. Preferably, the plurality of modules further includes a co-processing and reporting module adapted to co-process the input data and the reference data according to the at least one regulation method, and the co-processing and reporting module is further adapted to output a report indicating a validity status for each point of the plurality of data points. Typically, the validity status includes: pass, fail, and warning.

According to the teachings of the present invention there is also provided, a method for evaluating data points against at least one cadastral regulation comprising the steps of: storing and updating a cadastral rule database containing a plurality of rules for determining validity of cadastral data; obtaining from a data source reference data indicative of a plurality of established reference data points; receiving input data corresponding to a plurality of measured data points; and co-processing the input data and the reference data according to the plurality of rules to determine an indication of validity for the plurality of data points.

There is also provided a system for providing validation information during recording of data points for a cadastral survey, the system including: a field survey measuring device for measuring data points relative to a measurement network; and a validation subsystem in data communication with the field surveyor measuring device, the validation subsystem being configured to: receive data point measurement information from the measuring device, process the information according to a plurality of rules to determine an indication of validity of the data point, and output the indication of validity to the operator of the measuring device. Most preferably, the validation subsystem includes a plurality of software modules programmed into a computer, the plurality of modules being configured to: store and update a cadastral rule database containing a plurality of rules for determining validity of cadastral data; and obtain from a data source reference data indicative of a plurality of established reference data points, the cadastral rule database and the plurality of established reference data points being used in processing the information. Further preferably, the field survey measuring device and the validation subsystem are incorporated into a common housing. Typically, the field survey measuring device and the validation subsystem are in data communication via a wide area communication network. Further typically, the field survey measuring device and the validation subsystem are in data communication via wireless communication.

BRIEF DESCRIPTION OF THE DRAWINGS

The invention is herein described, by way of example only, with reference to the accompanying drawings, wherein:

FIG. 8 is a data screen representation of detailed information of the regulation method of FIG. 3.

DESCRIPTION OF THE PREFERRED EMBODIMENTS

The present invention is an apparatus and method for evaluating data points against cadastral regulations.

Figure 1:
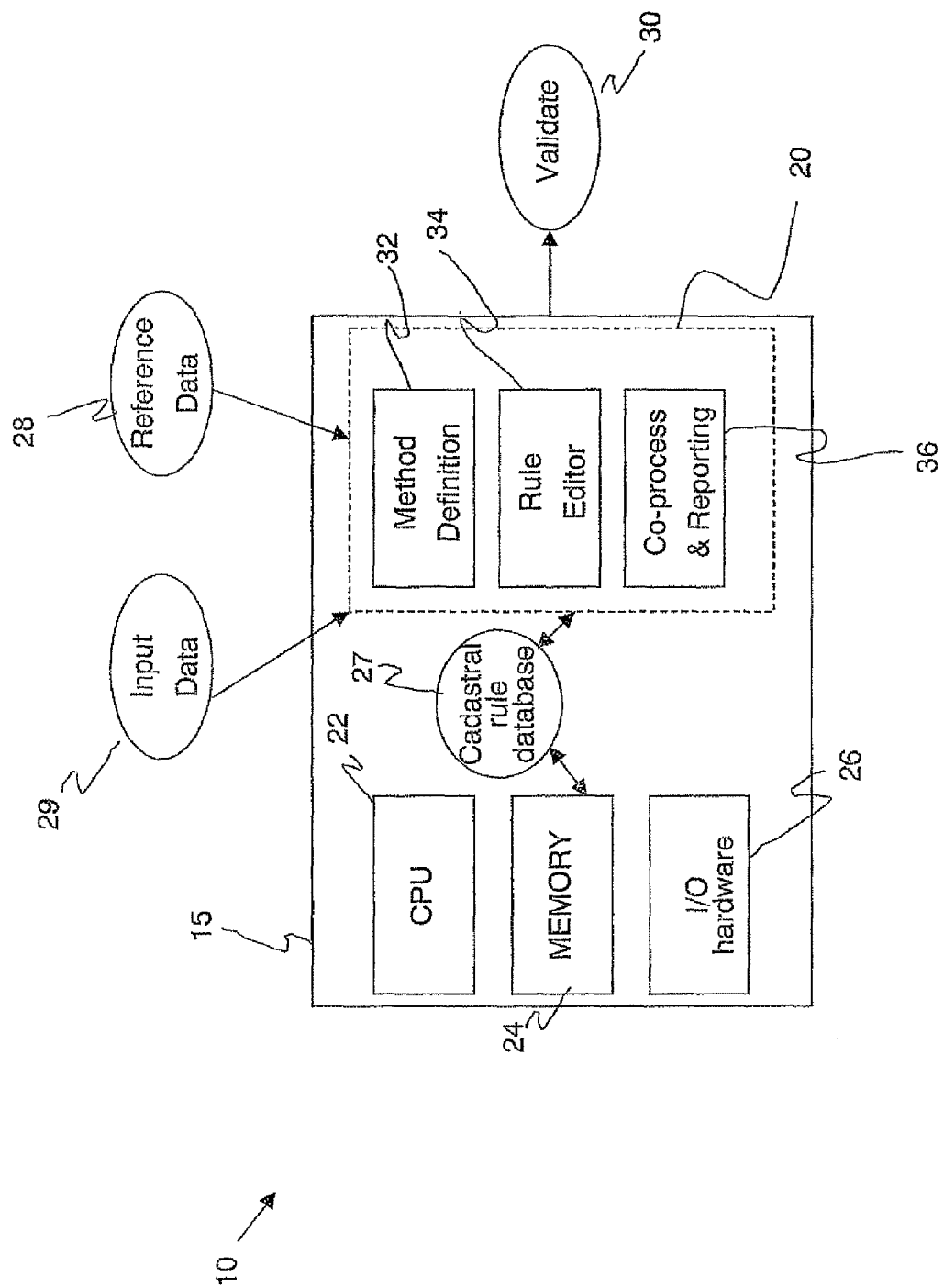
FIG. 1 is a block diagram of a system for evaluating data points against one or more cadastral point type regulations, in accordance with an embodiment of the current invention.

The principles and operation of an apparatus and method for evaluating data points against cadastral regulations according to the present invention may be better understood with reference to the drawings and the accompanying description. Referring now to the drawings, FIG. 1 is a block diagram of a system 10 for evaluating data points against one or more cadastral regulations, in accordance with an embodiment of the current invention. System 10 comprises a computer 15, having a CPU 22, a memory 24, I/O hardware 26, and a number of software modules 20. In one embodiment of the current invention, memory 24 may comprise both RAM and non-volatile memory, as known in the art. I/O hardware 26 typically includes wired and wireless I/O devices. Software modules 20 are configured to store and update a cadastral regulation rule data base 27 and to co-process reference data 28 against input data 29, corresponding to licensed surveyor measured data points, and to evaluate input data 29. Rule data base 27 typically has many regulation rules, each of which is a mathematical expression representing an aspect of a given cadastral regulation. (Specific examples of a regulation rules and corresponding aspects of a cadastral regulation are given hereinbelow.) In one embodiment of the current invention, rule data base 27 may be previously or initially loaded with a large number of regulation rules, based on a number of cadastral regulations. Alternatively or additionally, rule data base 27 may be updated from time to time, such as by internet subscription or CD update, to allow the user to more easily chose from an updated database or rule regulations.

Reference data 28 typically includes coordinate data from established reference points, examples of which may be: a permanent GPS station (PGS); a licensed horizontal control point (LHCP); and a licensed horizontal and vertical control point (LHVCP). An objective of evaluating input data 29 is to give an indication, whether by a report or by creation of an output file, of validity 30 of the input data when co-processed with regulation rules of rule database 27 and reference data 28.

Software modules 20 include a method definition module 32, which defines one or more regulation methods, each method being used to evaluate one of at least three data point types: new horizontal control (NUC), new vertical control (NVC), and new boundary control (NBC). As the names imply, survey data may include both horizontal points and elevation or vertical points. Standard and/or established survey points, such as those in reference data 28 discussed hereinabove, may also reflect horizontal, vertical, and horizontal and vertical orientations.

A regulation method includes one or more regulation rules, which are used in the co-processing. Details regarding regulation rules are presented hereinbelow. Another module included in software modules 20 is a rule editor 34, which is used to choose and recall a regulation rule from the rule database and to subsequently edit and assign a regulation rule to a regulation method. Another use of rule editor 34 is in specifying and inputting a regulation rule into the data base, such as when a new regulation rule, not previously stored in the data base, is specified. Software modules 20 also includes a co-processing and reporting module, which is responsible for co-processing, evaluating, and reporting on the validity of the input data, as noted hereinabove. In one embodiment of the current invention, every point in the input data base is validated and a report is given against each regulation rule activated in one or more regulation methods. Report values may be either "pass" or "fail" and sometimes "warning".

Figure 2:
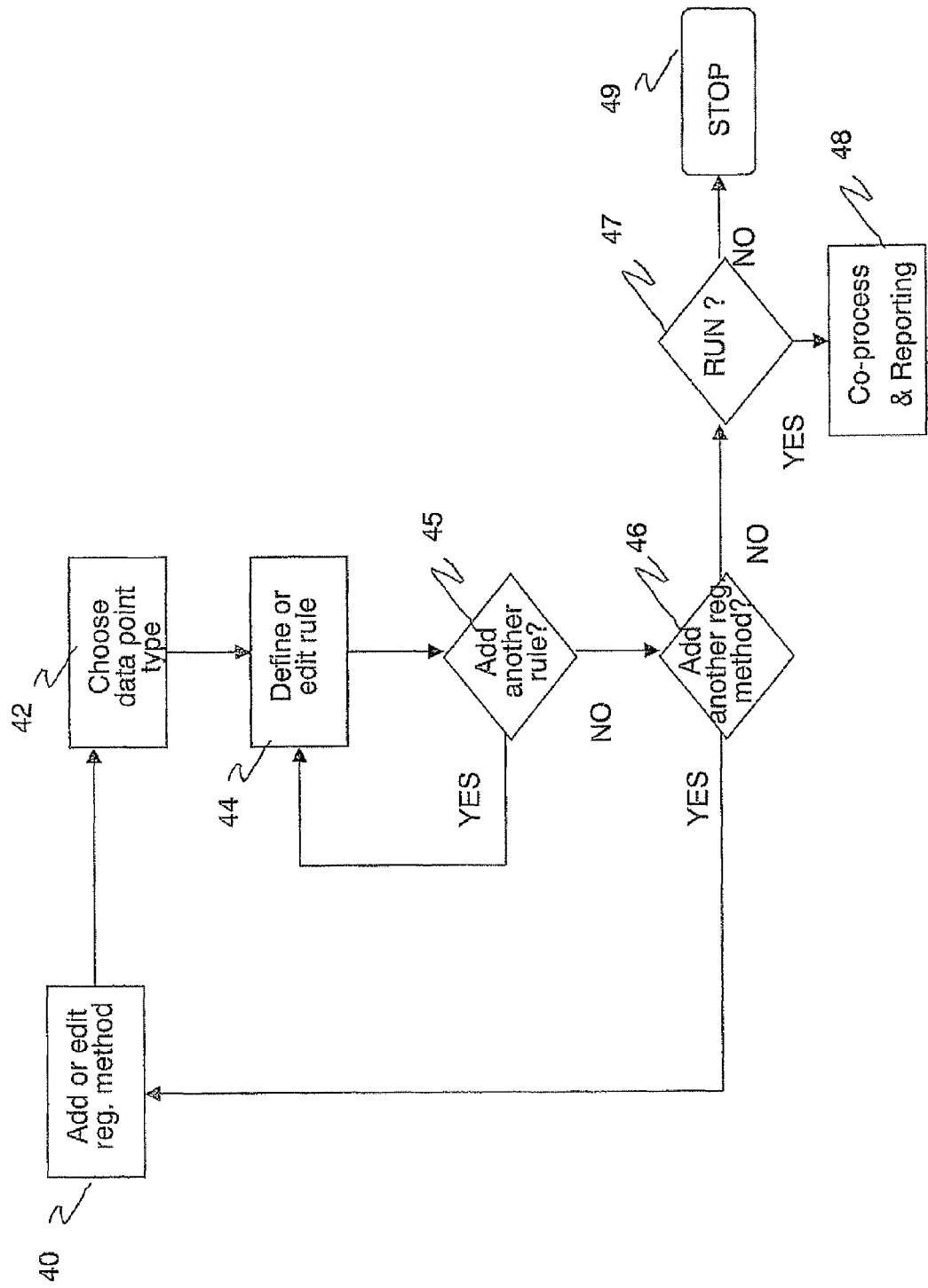
FIG. 2 is a flow chart of the interaction of software modules, in accordance with an embodiment of the current invention.

Reference is now made to FIG. 2, which is a flow chart of interaction of software modules 20, in accordance with an embodiment of the current invention. A first step in the logic flow of software modules 20 is Add or edit regulation method 40, since there must be at least one regulation method with which to proceed. As noted hereinabove, each regulation method has an associated data point type. Choose data point type 42 is the first step in specifying a regulation method. Additional coordinate operating functions are also specified as part of this step. Coordinate functions are known in the art and are described hereinbelow in FIG. 4. A regulation rule is defined (from the rule database) and/or edited and the regulation rule may be added to the regulation method in Define or edit rule 44. Additional parameters are specified in respective regulation rules, as shown in the example presented hereinbelow. At this point, Add another rule 45 is asked, and additional regulation rules may be added to the regulation method if the answer is "YES", with control reverting to step 44. If the answer is "NO", Add another regulation method 46 is asked, and additional regulation methods may the answer is "YES", with control reverting to step 40, If the answer is "NO", RUN 47 is asked. If the answer is "NO", building the regulation method and its associated regulation rules is complete and control is reverted to STOP 49. If the answer is "YES", co-processing and reporting 48 of the regulation method or methods versus the reference data and the input data (as indicated in FIG. 1.) takes place.

Figure 3:
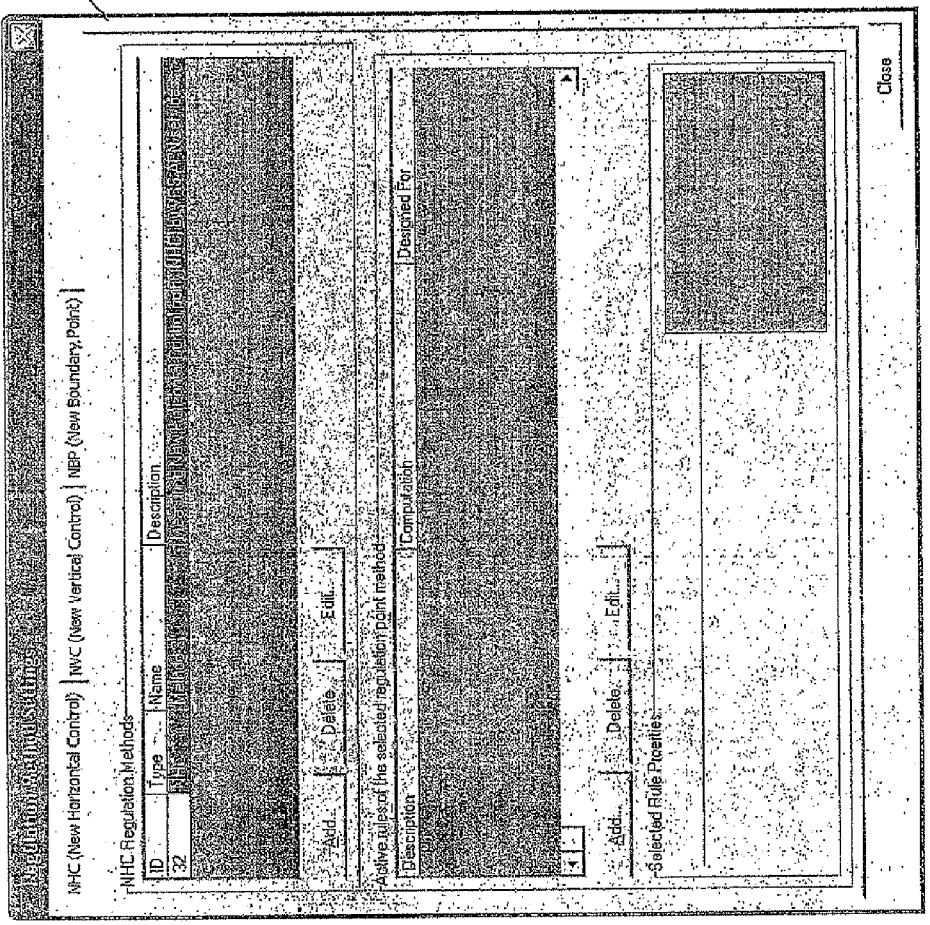
FIG. 3 is a data screen representation of data of the method definition module of the system shown in FIG. 1.
Figure 4:
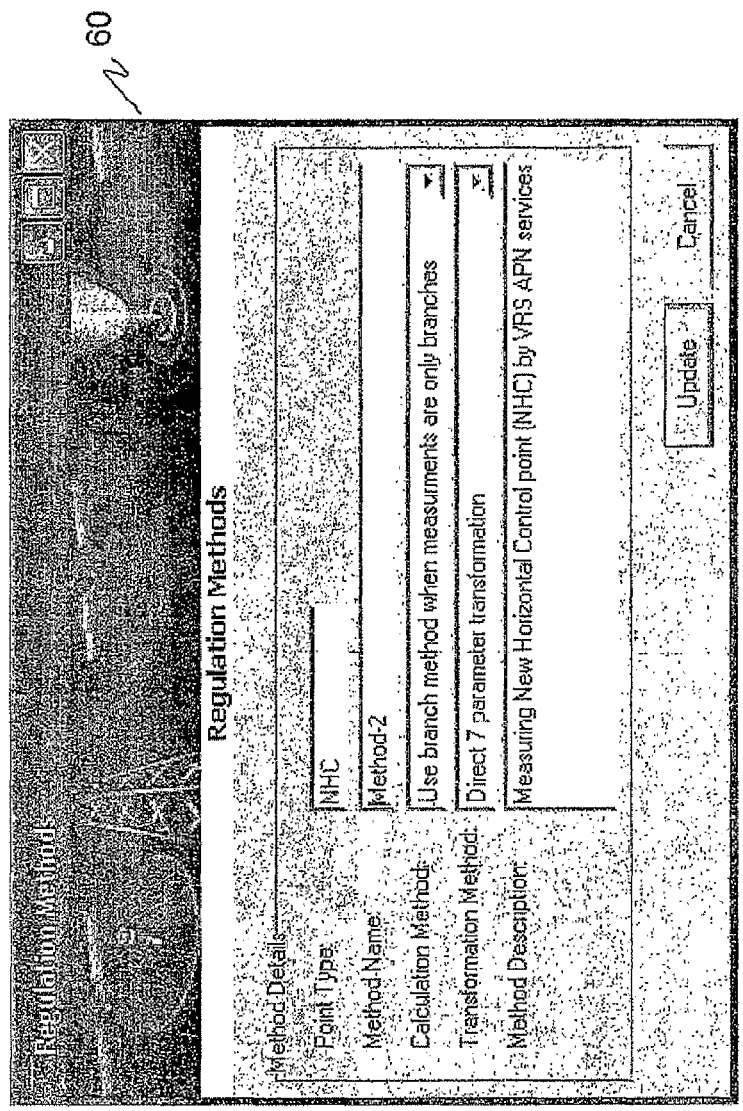
FIG. 4 is a data screen representation of summarized information of the regulation method of the system as shown in FIG. 1.

Reference is now made to FIGS. 3 through 8, which are, respectively: a data screen representation of the method definition module 50; summarized information of the regulation method 60; and three data screen representations of data of the rule editor module 70, 80, 90 of the system shown in FIG. 1. FIGS. 3 through 8 additionally serve as examples of values and interactions of the software modules shown in FIG. 1. Referring to FIG. 3, when first defining a regulation method, one of three tabs (NHC, NVC, and NBP) may be chosen. In the figure, NHC has been chosen and one NHC regulation method is identified. As noted previously, more than one regulation method may be specified, but in the example presented herein, only one regulation method has be shown. (Additional regulation methods may be added by choosing Add.) An ID number, Name, and Description are assigned, whereas the type indicated reflects NHC, as previously chosen. Deleting and editing a regulation method is also possible by respectively choosing Delete and Edit. The current figure shows no active regulation rule, otherwise known as a "point method". However, active regulation rules will be shown hereinbelow. Choosing "Close" yields FIG. 4, summarized information of the regulation method 60.

In FIG. 4, the method name (i.e., "Method 2") is displayed, as well as its point type ("NHC"). Coordinate operating functions, indicated respectively as Calculation Method and Transformation Method are specified for the regulation method and are defined in this screen. Calculation method refers to a coordinate operating function known in the art, for adjusting and correcting data sets related to coordinates within a given or so-called "internal" frame of reference, otherwise known as a an internal coordinate network. The method chosen "Use branch method . . . " is one of various methods known in the art for adjusting and correcting data sets to yield full closure of typical triangles, fanned from survey points (and not approximate closure of the triangles, due to the statistical nature of and slight errors Inherent in cadastral measurements). Transformation method refers to a method of transforming the internal coordinate network inherent in the measured data of the data input to the coordinate network of one or more established reference points. Such a transformation may be useful or necessary when, for example, survey data points in a local region (i.e. internal network) are to be related to a national system of reference points and the national system's coordinate network (i.e. other network).

Figure 5:
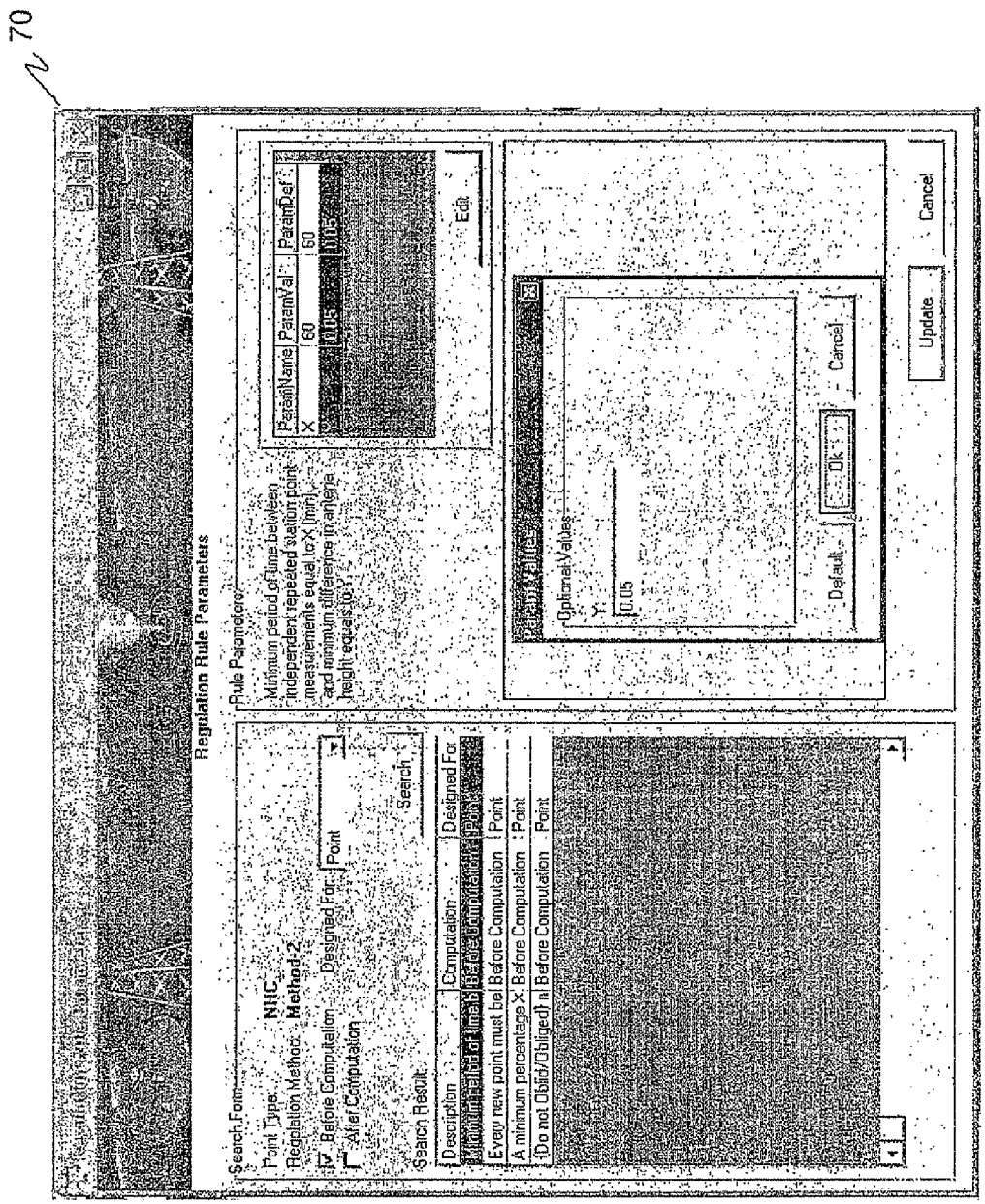
FIG. 5 is a data screen representation of data of the rule editor module of the system shown in FIG. 1.
Figure 6:
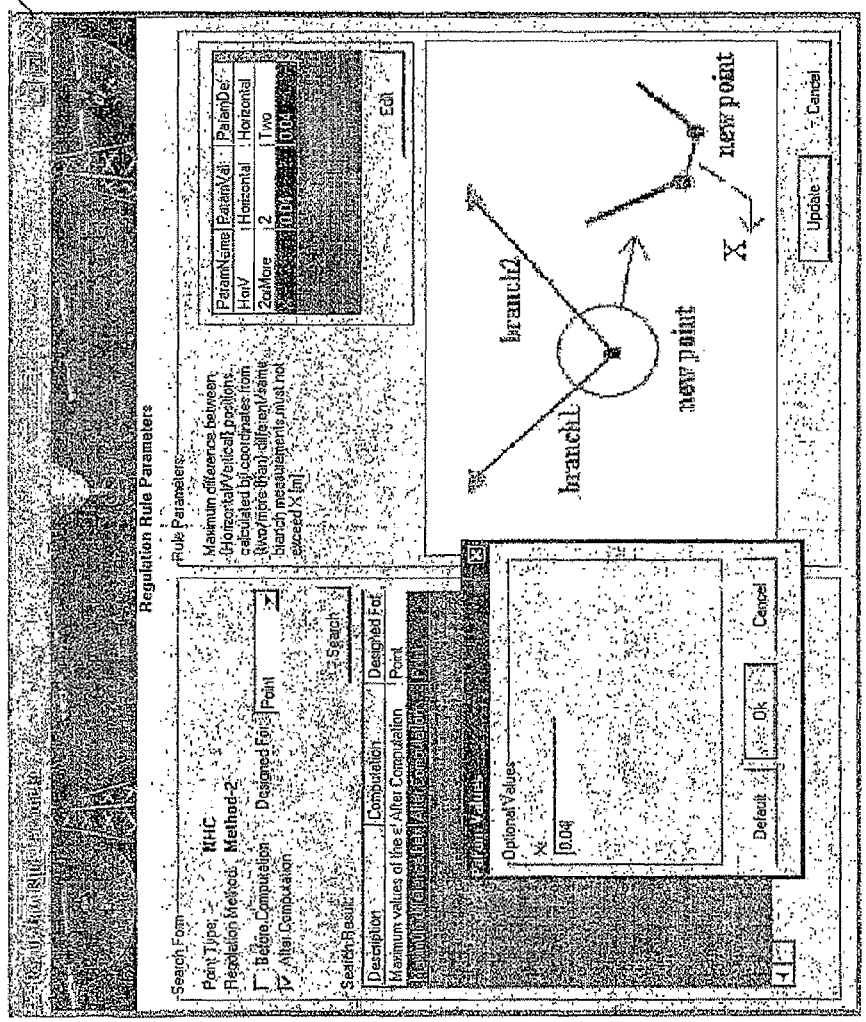
FIG. 6 is a data screen representation of data of the rule editor module of the system shown in FIG. 1, showing an after computation point type.
Figure 7:
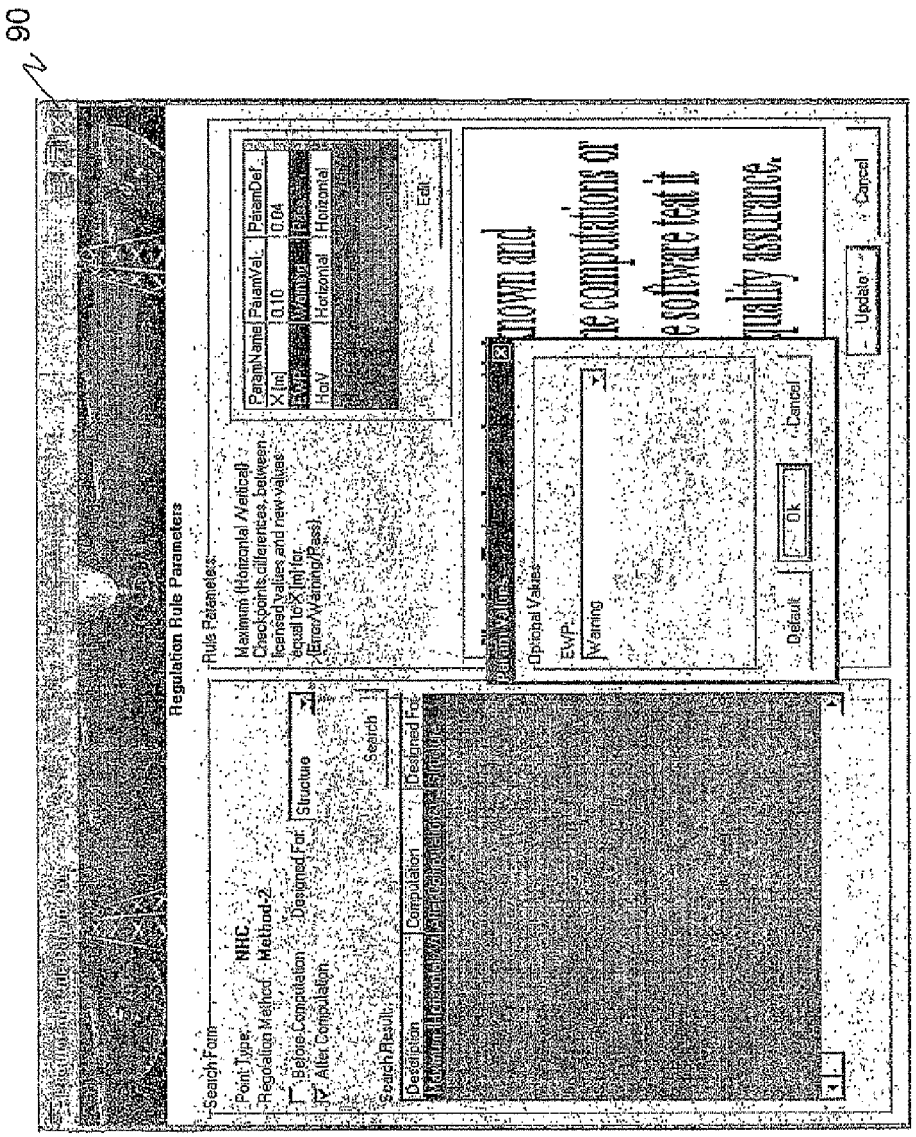
FIG. 7 is a data screen representation of data of the rule editor module of the system shown in FIG. 1, showing an after computation, structure with EWP allowing for "error", "warning" or "pass" upon evaluating the input data.

Embodiments of the current invention allow evaluation of data points against various regulation rules before or after coordinate operating functions are applied to the data set. An example of this is shown in FIG. 5, which is a data screen representation of data of the rule editor module 70. Data screen 70 is accessed by choosing Add in data screen 50 (FIG. 3) under "Active rules of the selected . . . ". A similar form of data screen 70 is repeated in data screens 80 and 90 (FIGS. 6 and 7), however different rules and some different data are shown, by way of example. Four regulation rules are listed in data screen 70, all having "Before Computation" and "Designed For: Point" specified for them. All of the four regulation rules shown in the present screen have are applicable to points and the regulation rules reflect an aspect of a cadastral regulation that is evaluated before computation of the coordinate operating functions described hereinabove. For example, the uppermost rule regulation is highlighted, identified as "Minimum period of time . . . ". To the right, under "Rule Parameters" the text of the entire rule is noted. Furthermore, in the window to the right of the textual description of the regulation rule, the quantitative values are indicated, namely "minimum difference in antenna height (i.e. Y) of 0.05", also having a default value of 0.05. (This dimension would typically be in meters, although this is not indicated in the current screen.). It can be seen that the Y value may be modified or retained as is. Because this regulation rule has parameters of time and antenna height—both being independent of the value of the coordinates of the data, this regulation rule is indicated as "Before Computation", meaning the rule may be applied against the data before any coordinate operating functions are applied to the data set.

In data screen 80 (FIG. 6), two regulation rules are listed, having "After Computation" and "Designed For: Point" specified. The two regulation rules shown in the present screen are applicable to surveyed points, and the regulation rules reflect an aspect of a cadastral regulation that is evaluated after computation of the coordinate operating functions. In reading the text of the emphasized rule, "Maximum difference between Horizontal/Vertical . . . " (shown in its entirety to the right, under "Rule Parameter") it is clear that the quantitative parameters of this regulation rule, listed to the right, are evaluated after computation of the coordinate operating functions. As in the previous data screen 70 example, the present screen also has a window entitled "Param Values" (as shown to the left) where the highlighted parameter values may be edited or accepted. The diagram shown in the lower right of data screen 80 is an illustrative guide, serving to interpret the textual descriptor of the highlighted rule. In this specific example, a diagram was stored in memory to serve as an aid in applying this specific rule.

In data screen 90 (FIG. 7), one regulation rule is listed, having "After Computation" and "Designed For: Structure" specified. The regulation rule shown in the present screen is applicable to a surveyed structure (such as a pole or tower) and the regulation rule reflect an aspect of a cadastral regulation that is evaluated after computation of the coordinate operating functions. Note in the parameter "EWP" emphasized in the upper right hand window may take on the values of Error, Warning, and Pass—as indicated in the textual descriptor under "Rule Parameters". The Param Value editing window shown has a pull-down list that allows editing of the current "Warning" value to either "Error" or "Pass".

Figure 8:
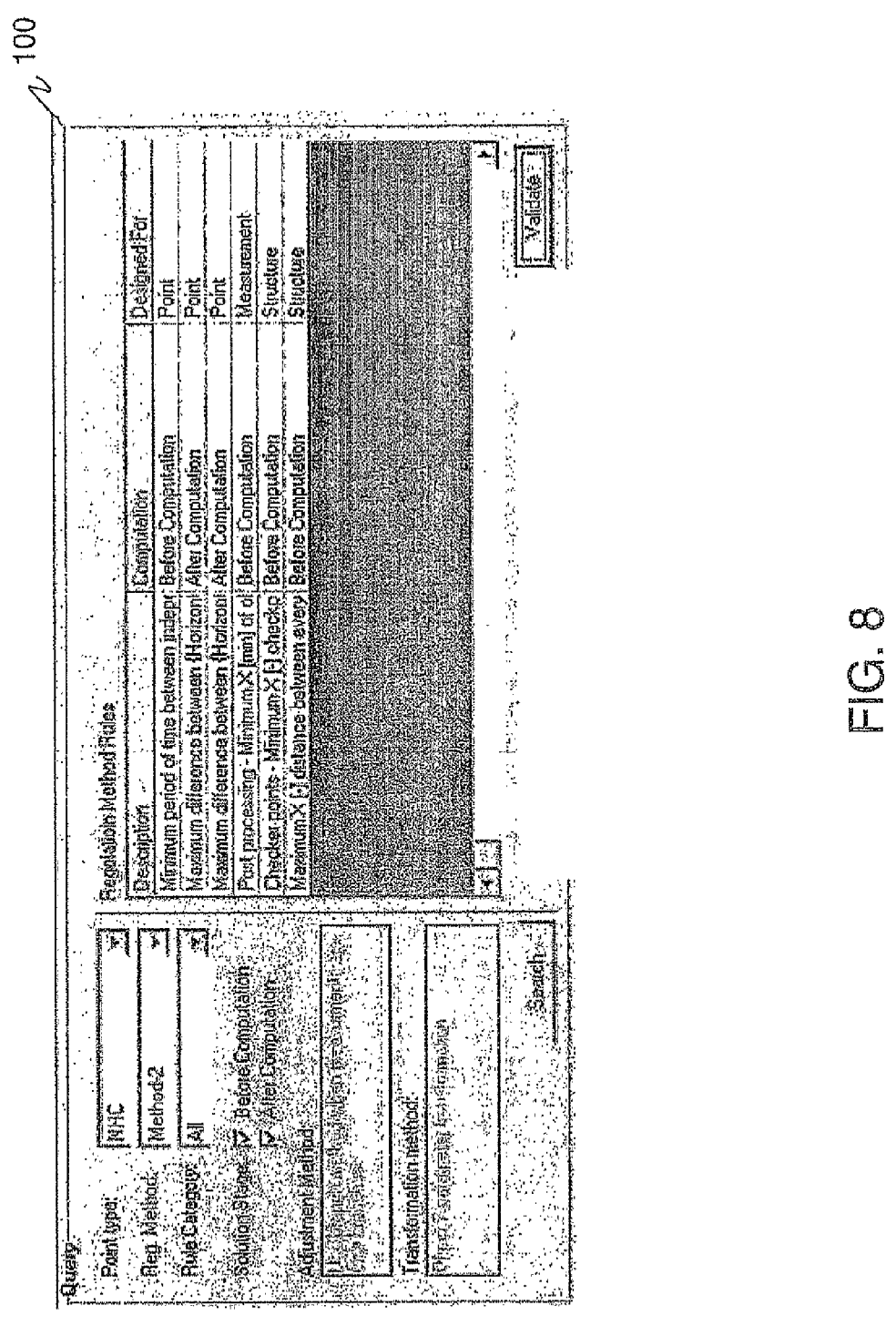

Reference is now made to FIG. 8, which is data screen representation of detailed information 100 of the regulation method of FIG. 3. Data screen 100 is an example of a regulation method having six regulation rules assigned to it. In data screen 100, which is accessible after choosing Close in screen 50 (FIG. 3), it can be seen that regulation rules that have Before Calculation and After Calculation status are shown. Furthermore, a rule category which in the example takes on the value of point, measurement, and structure. The adjustment and transformation methods are indicated, but are not editable from the present screen. After all regulation rules and the regulation method have been reviewed, Validate may be chosen to co-process the rules and data as described hereinabove.

Figure 9:
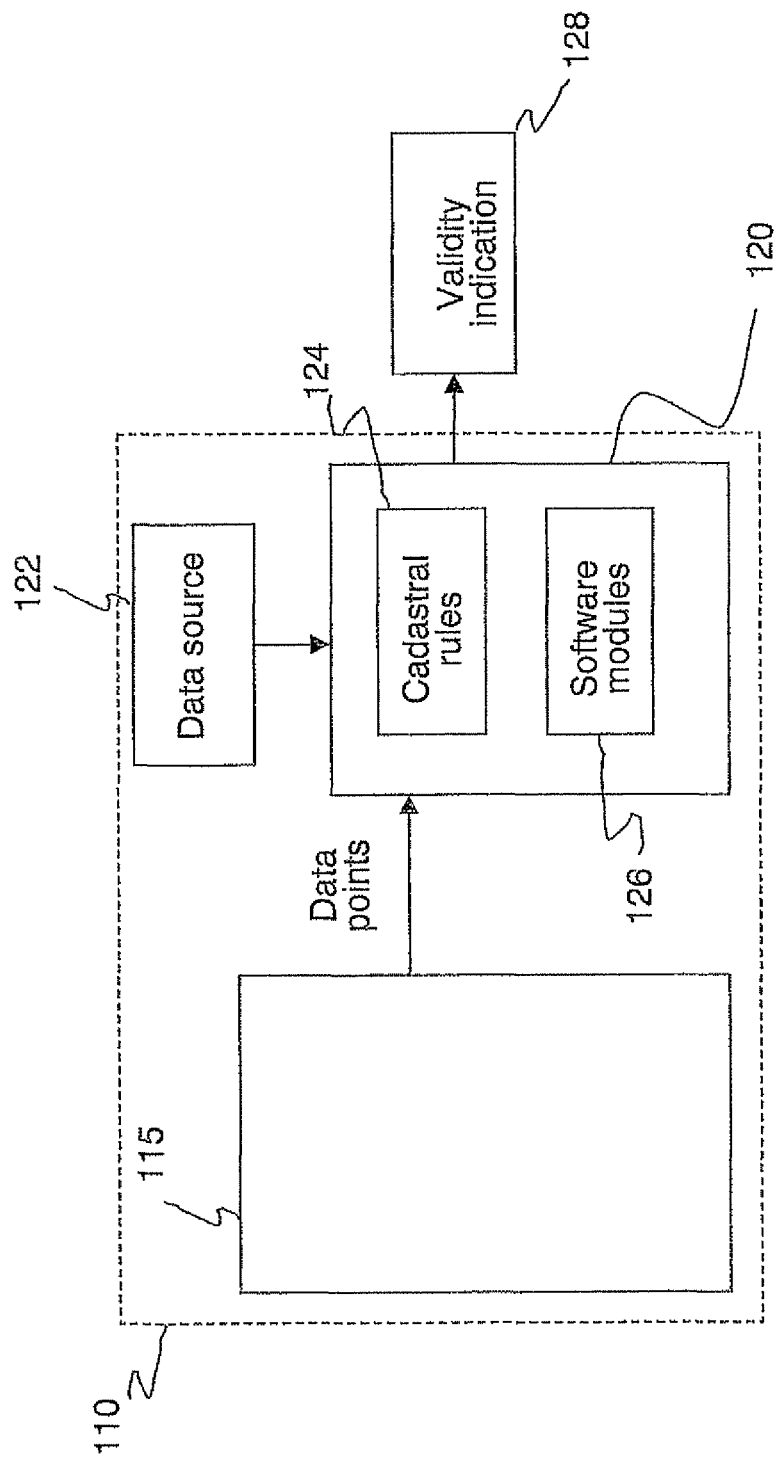
FIG. 9 is a block diagram showing a device for evaluating data points against one or more cadastral point type regulations, integrated for use in the field with a survey measuring device, in accordance with an embodiment of the current invention.

Reference is now made to FIG. 9, which is a block diagram of a system 110 for providing validation information during recording of data points for a cadastral survey, integrated with a field survey measuring device 115, in accordance with an embodiment of the current invention. The system includes a validation subsystem 120, which receives data point measurement information from measuring device 115 and data source 122 information regarding established reference data points. The data point information and data source 122 inputs are processed by the validation subsystem having a cadastral rule database 124 and software modules 126 to provide a validity indication 128 to a operator (not shown) in the field. In one embodiment of the present invention, validation subsystem 120 and survey measuring device 115 are housed in a common housing, providing a self contained and portable unit for measuring and validating measurements in the field in real time or in near-real time. This substantially immediate feedback not only facilitates field work, but it also provides a powerful tool for decision making—whether to conclude measuring work to continue measuring in the field. In another embodiment of the present invention, validation subsystem 120 may be remotely located from measuring device, but having data communication in wired or wireless form. With the validation subsystem remotely located, decision making as noted above may also be supported from a distance where, for example, office staff or fellow workers at a distant location may provide insight and further advice as how to proceed in the field.

It will be appreciated that the above descriptions are intended only to serve as examples, and that many other embodiments are possible within the scope of the present invention as defined in the appended claims.

What is claimed is:

1. A system for measuring and evaluating the accuracy of geodetic measurements comprising:
   a field survey measuring device; and
   a plurality of software modules programmed into a computer, the computer having a CPU, a memory, and I/O hardware, the plurality of modules being configured to:
   store and update a regulation rules database containing a plurality of regulation rules for determining validity of geodetic measurements;
   select at least one data point type to be evaluated;
   select at least one regulation rule from said plurality of regulation rules;

select at least one regulation calculation method from said regulation rules database;

receive input measured data points from said field survey measuring device corresponding to said at least one data point type;

obtain, from a data source, reference data indicative of a plurality of established reference data points;

co-process the input measured data points and the reference data points according to said at least one data point-type, said at least one regulation rule and said at least one regulation calculation method to determine an indication of validity for the accuracy of the measured data points in real time, said at least one regulation rule comprising an evaluation indicator indicating when said at least one regulation calculation method is to be applied to said input measured data points, said co-process comprising:

evaluating said input measured data points based on said at least one regulation calculation method; and evaluating said input measured data points and said reference data points based on said at least one regulation rule; and generate a report indicating the validity of the measured data points in real time, said plurality of modules further including a method definition module adapted to define at least one regulation method to operate upon a selected data point type, the at least one regulation method including:

at least one rule for the co-processing;

a specification of a textual regulation descriptor; and coordinate operating functions including:

a calculation method to adjust data point coordinate values to allow closure of the data points; and a transformation method to transform an internal coordinate network associated with the input data to another coordinate network associated with at least one reference point.

2. The system of claim 1, wherein the method definition module is further adapted to define at least one regulation method for at least three data points including: a new horizontal control point (NHC); a new vertical control point (NVC) and a new boundary point (NBP).

3. The system of claim 1, wherein the plurality of modules further includes a rule editor module activated by the method definition module, the rule editor module being configured to input, edit, and recall from the regulation rules database at least one regulation rule from the plurality of regulation rules.

4. The system of claim 3, wherein the rule editor module is further configured to edit rule parameters of the at least one regulation rule and to update and include the at least one regulation rule, along with the at least one of the plurality of rules for the co-processing, in the at least one regulation method.

5. The system of claim 4, wherein the rule parameters include generic rule parameters and specific rule parameters.

6. The system of claim 5 wherein the generic rule parameters include: a specification to apply or not to apply the coordinate operating functions during co-processing and an indication of a rule category, including at least: point, measurement, and structure.

7. The system of claim 1, wherein the report indicates a validity status for each point coordinate of the measured data points.

8. The system of claim 7, wherein the validity status includes: pass, fail, and warning.

9. The system of claim 1 wherein said field survey measuring device and said computer are housed in a common housing.

10. The system of claim 9 wherein said common housing is a portable common housing.

11. The system of claim 1 wherein said evaluation indicator indicates that said evaluating said input measured data points based on said at least one regulation calculation method is to be performed prior to said evaluating said input measured data points and said reference data points based on said at least one regulation rule.

12. The system of claim 1 wherein said evaluation indicator indicates that said evaluating said input measured data points based on said at least one regulation calculation method is to be performed after said evaluating said input measured data points and said reference data points based on said at least one regulation rule.

13. The system of claim 1 wherein said plurality of established reference points include at least one of a permanent global positioning system (GPS) station, a licensed horizontal control point and a licensed horizontal and vertical control point.

14. A method for measuring and evaluating the accuracy of measurements of geodetic data points, the method comprising:

storing and updating a regulation rules database containing a plurality of regulation rules for determining validity of measured geodetic data points;

selecting at least one data point type to be evaluated;

selecting at least one regulation rule from said plurality of regulation rules;

selecting at least one regulation calculation method from said regulation rules database;

receiving measured input data from a field survey measuring device corresponding to said at least one data point type;

obtaining, from a data source, reference data indicative of a plurality of established reference data points;

co-processing the measured input data and the reference data according to said at least one data point type, said at least one regulation rule and said at least one regulation calculation method to determine an indication of validity for the accuracy of the measured input data in real time, said at least one regulation rule comprising an evaluation indicator indicating when said at least one regulation calculation method is to be applied to said input measured data points, said co-processing comprising:

evaluating said input measured data points based on said at least one regulation calculation method; and evaluating said input measured data points and said reference data points based on said at least one regulation rule;

defining at least one regulation method to operate upon a selected data point type, the at least one regulation method including:

at least one rule for the co-processing;

a specification of a textual regulation descriptor; and coordinate operating functions including:

a calculation method to adjust data point coordinate values to allow closure of the data points; and a transformation method to transform an internal coordinate network associated with the input data to another coordinate network associated with at least one reference point and generating a report indicating the validity of the measured input data-in real time.

* * * * *